C. A. H. DE SAULLES.
APPARATUS FOR TREATING ZINC.
APPLICATION FILED JULY 10, 1917.
1,279,292.
Patented Sept. 17, 1918.
3 SHEETS—SHEET 2.
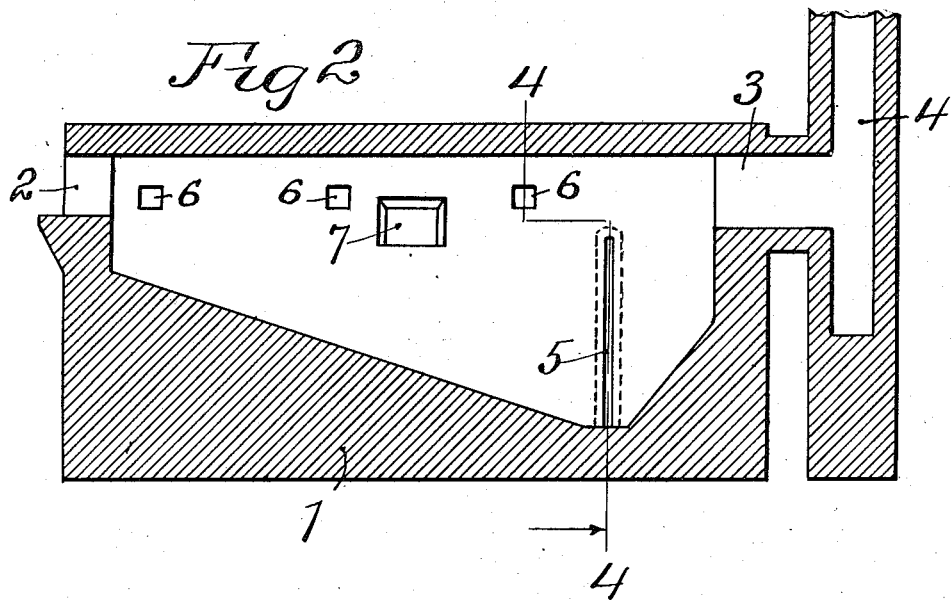
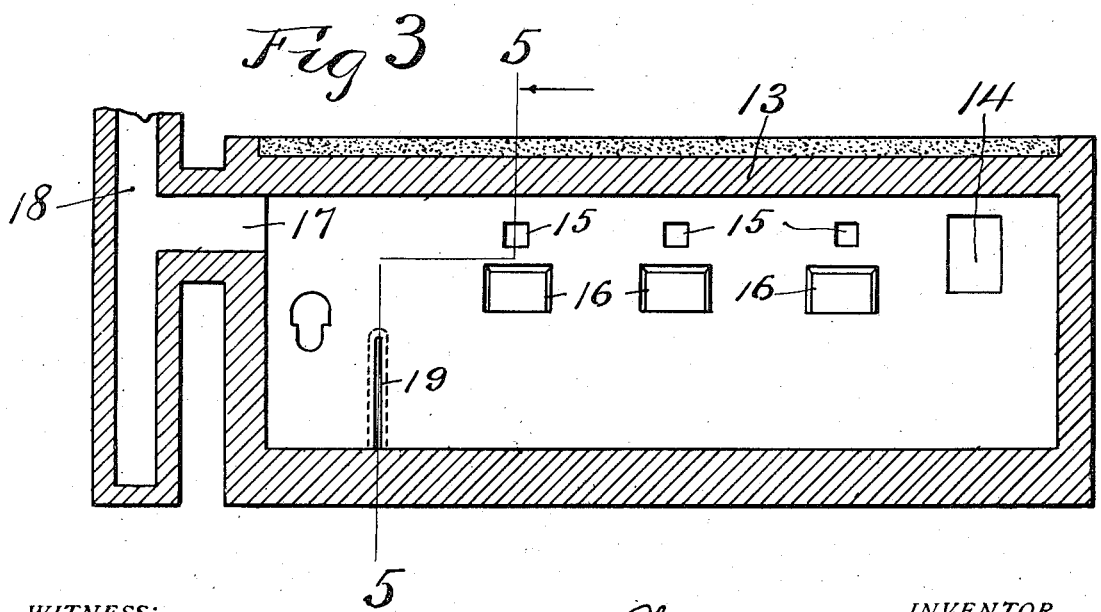

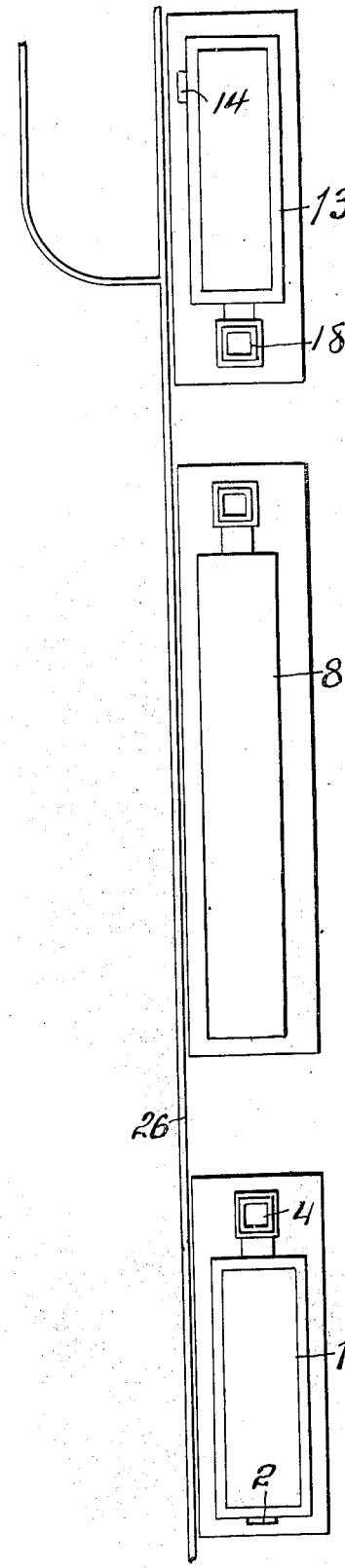

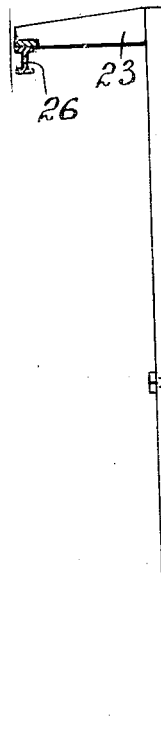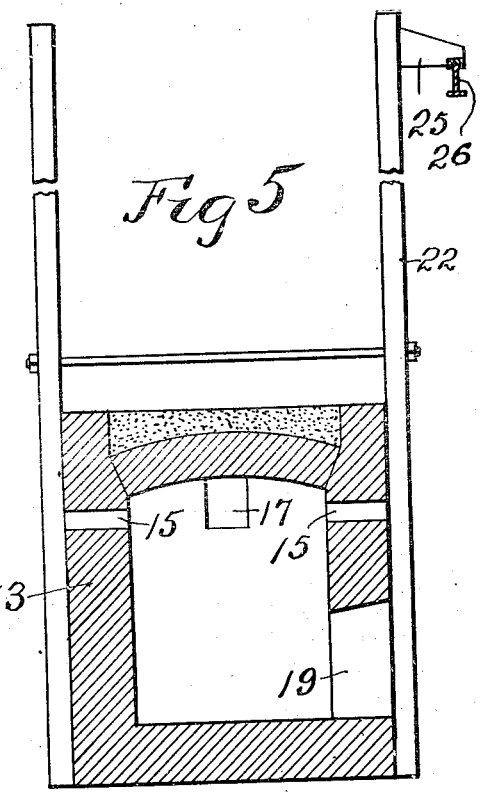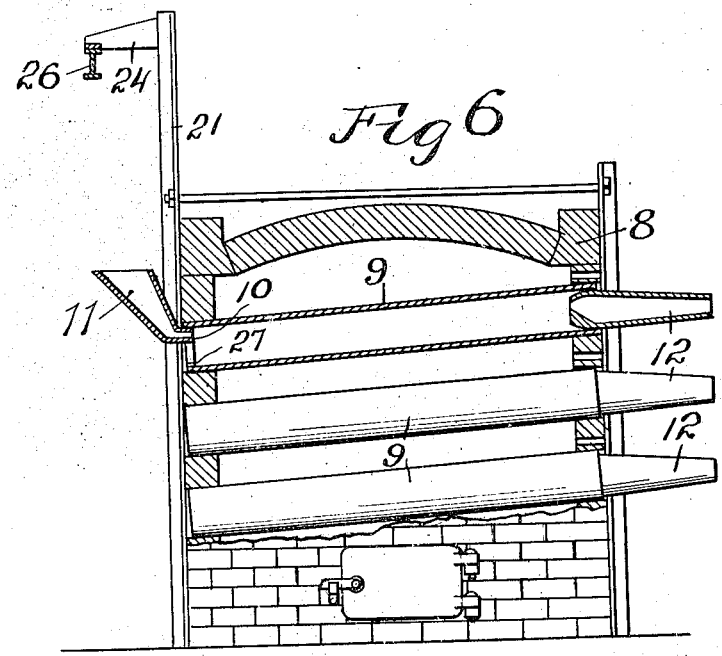

UNITED STATES PATENT OFFICE.

CHARLES A. H. DE SAULLES, OF NEW YORK, N. Y.

APPARATUS FOR TREATING ZINC.

1,279,292.   Specification of Letters Patent.   Patented Sept. 17, 1918.

Application filed July 10, 1917. Serial No. 179,640.

*To all whom it may concern:*

Be it known that I, CHARLES A. H. DE SAULLES, a citizen of the United States, residing at New York city, in the borough of Manhattan and State of New York, have invented a certain new and useful Improvement in Apparatus for Treating Zinc, of which the following is a specification.

My invention relates to improvements in apparatus for treating zinc.

It relates particularly to an apparatus adapted to treat zinc which contains lead.

The object of my invention is to provide an apparatus by which large quantities of high grade zinc of uniform quality may be economically produced.

My improved apparatus is adapted to carry into effect my improved process of treating zinc which is described and claimed in my copending allowed application #59,353, filed November 3, 1915.

In carrying my invention into effect, I provide in combination a melting furnace, in which a large amount of the lead and other impurities are separated from the spelter by gravitation; a retort furnace, in which the molten zinc taken from the melting furnace is distilled and collected in condensers; and a mixing furnace in which the molten zinc from the condensers is collected and subjected to stirring, whereby a large body of molten zinc of a uniform grade is obtained.

By retaining the zinc in a molten condition, from the time it leaves the melting furnace until it is deposited in the retort furnace, and from the time that it is condensed to liquid spelter in the condensers, until it has been deposited in the collecting and mixing furnace, great economy in fuel is effected and a very high grade of zinc of uniform quality is obtained.

Ordinarily zinc is charged into the retorts in a solid condition, and requires to be melted therein, thereby disturbing the temperature conditions in the retort furnace, which change in conditions results in the production of zinc which is not uniform as to grade. By charging the retorts with molten zinc, taken from the melting furnace, the temperature conditions of the retorts are not disturbed and great uniformity of the product which is collected in the condensers is thus obtainable. Owing to the difficulty of subjecting several retorts of a retort furnace to the same temperature conditions, which difficulty is greatly amplified, when the zinc is charged greatly in the retorts in a solid state, the percentage of lead contained in the zinc in the different condensers varies, thereby varying the grades of zinc contained in the different condensers. Ordinarily the zinc is taken in small quantities from the condensers, by ladles, and is cast in small slabs, which vary greatly as to grade and uniformity of composition. Some of the zinc will be of sufficiently high grade as to be suitable for certain purposes, such as for making brass for drawn work, such as cartridge shells, while some of the zinc will contain too much lead for it to be suitable for such purposes. Or the zinc taken separately from the condensers, while possibly sufficiently low in lead, will not be uniform in composition, which lack of uniformity will render it undesirable and unsuitable for manipulation with dies, owing to the lack of like results under like manipulation.

By collecting the product of the different condensers in the mixing furnace, and in a molten state, until a large quantity has been thus amassed, and thoroughly stirring and mixing the molten body thus collected, complete uniformity of the whole mass is obtained, thus, enabling the production of a large quantity of spelter which will be absolutely uniform in its composition.

In the accompanying drawings, which illustrate my improved apparatus,

Figure 1 is a plan view of the apparatus.

Fig. 2 is a longitudinal vertical sectional view of the melting furnace.

Fig. 3 is a longitudinal vertical sectional view of the mixing furnace.

Fig. 4 is a cross section on the line 4—4 of Fig. 2.

Fig. 5 is a cross section on the line 5—5 of Fig. 3.

Fig. 6 is a view partly in end elevation and partly in vertical section of the retort furnace.

Similar reference characters designate similar parts in the different views.

1 designates the melting furnace having at one end a feed opening 2 and at the other end a discharge opening 3 which communicates with a stack 4.

The floor of the furnace is preferably sloping, as shown in Fig. 2, and one side wall is provided with a vertical draw-off slot 5, which extends vertically from the lowest part of the floor, and through which lead and other impurities may be withdrawn. The side walls of the furnace 1 are provided with openings 6, through which burning gas may be projected into the furnace for melting the zinc.

The side wall of the furnace may be provided with an opening 7 for the insertion of skimming tools.

Referring to Fig. 6, 8 designates the walls of the retort furnace which is provided with vertical rows of retorts 9, preferably inclined, and provided each at its lower end with a feed opening 10 adapted to receive a funnel 11, through which molten zinc taken from the melting furnace 1, may be poured into the different retorts.

The condensers 9 discharge respectively at their upper ends into condensers 12, in which the distilled zinc is collected in a molten state, and in such state transferred to the melting furnace 13, Fig. 3, which may be of any suitable reverberatory type, and which is provided in one side wall adjacent to one end with a feed opening 14, through which the molten zinc from the condensers 12 is fed.

The side walls of the furnace 3 may be provided with openings 15, through which burning gas may be projected for retaining the zinc in a molten condition.

The side walls of the mixing furnace 13 may also be provided with openings 16, through which stirring bars may be inserted for stirring and thoroughly mixing the molten zinc.

The end of the furnace 13 which is distant from the feed opening 14, is provided with a discharge opening 17, which discharges into a stack 18.

One side wall of the furnace 13 is provided with a vertical draw-off slot 19, which extends upwardly from the floor of the furnace, and through which the molten zinc may be withdrawn.

20, 21 and 22, Figs. 4, 6 and 5, designate respectively vertical posts or bars, which respectively form parts of the frameworks of the furnaces 1, 8 and 13. These bars respectively support brackets 23, 24 and 25, which carry an elevated rail 26 on which may run wheel supported ladles, not shown, with which the molten material is first transferred from the furnace 1 to the furnace 8, and thence to and from the mixing furnace 13.

In the operation of my invention, the zinc to be treated is charged into the mixing furnace 1, where it is melted and in which the lead separates from the zinc by gravitation, the lead settling in the lowest part of the furnace from which it is withdrawn in the usual manner through the draw-off slot 5.

After the zinc has been preliminarily refined by gravitation in the furnace 1, it is, while still in a molten condition, withdrawn through the slot 5 into ladles, which are carried by the rail 26 to the distilling furnace 8, where the molten zinc is charged into retorts through the funnel 11.

Each retort 9 at its lowest end, below the feed opening 10 may be provided with a draw-off opening 27, through which such lead, as settles in the lower end of the retort, may be withdrawn.

The furnace 8 may be heated in any well known manner, so as to effect distillation of the zinc contained in the retorts 9.

The distilled zinc passes into the condensers 12, in which it is condensed to liquid spelter. The liquid spelter is taken from the condensers in ladles which are carried on the rail 26 to the mixing furnace 13, into which the molten zinc is discharged through the feed opening 14.

After a large body of the molten zinc has been accumulated in the mixing furnace 13, it is thoroughly mixed and intermingled by wooden bars projected through the openings 16, thereby obtaining a very large body of zinc, which is of maximum uniformity in composition and quality.

When a sufficient mass has been collected and made homogeneous in the mixing furnace 13, it may be withdrawn through the slot 19 and cast into slabs, which will all be uniform and which will produce like results when made into brass and the brass is subjected to manipulation in dies.

I do not limit my invention to the precise structure described and illustrated, as many modifications, within the scope of the appended claims, may be made without departing from the spirit of my invention.

What I claim is:—

1. In an apparatus for treating zinc, a melting furnace provided with means which permit separation of lead from zinc by gravitation, a distilling furnace provided with means by which molten zinc from the melting furnace may be fed therein and provided with a plurality of condensers into which the distilled zinc is discharged and condensed to liquid, and a mixing furnace provided with means for receiving molten zinc from the condensers.

2. In an apparatus for treating zinc, a melting furnace provided with means which permits separation of lead from zinc by gravitation, a distilling furnace provided with means by which molten zinc from the melting furnace may be fed therein and provided with a plurality of condensers into which the distilled zinc is discharged and condensed to liquid, a mixing furnace provided with means for receiving molten zinc from the condensers, and means by which molten zinc may be transferred from the mixing furnace to the distilling furnace, and from the distilling furnace to the mixing furnace.

In testimony whereof I have signed my name to this specification.

CHARLES A. H. DE SAULLES.